UNITED STATES PATENT OFFICE.

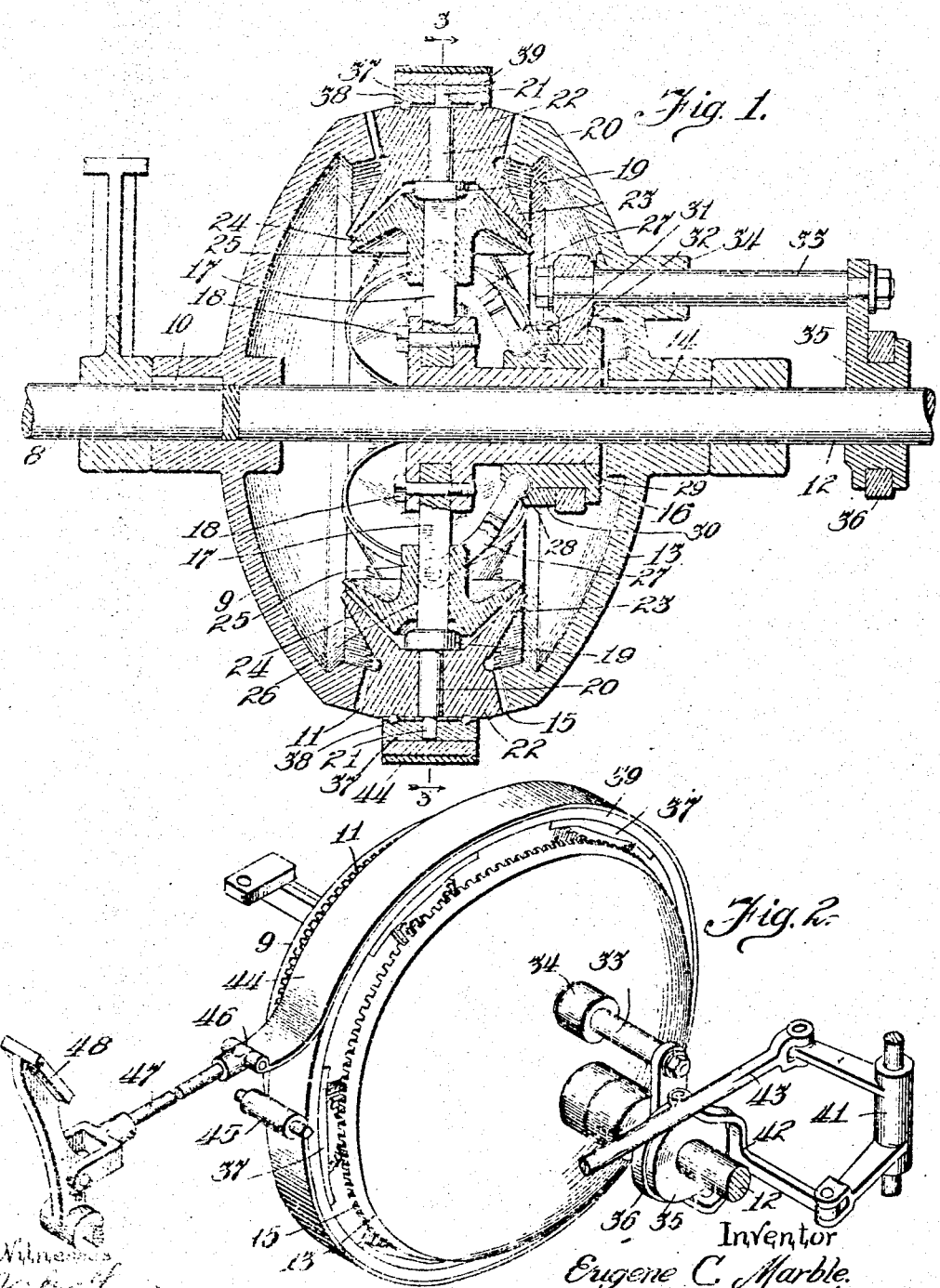

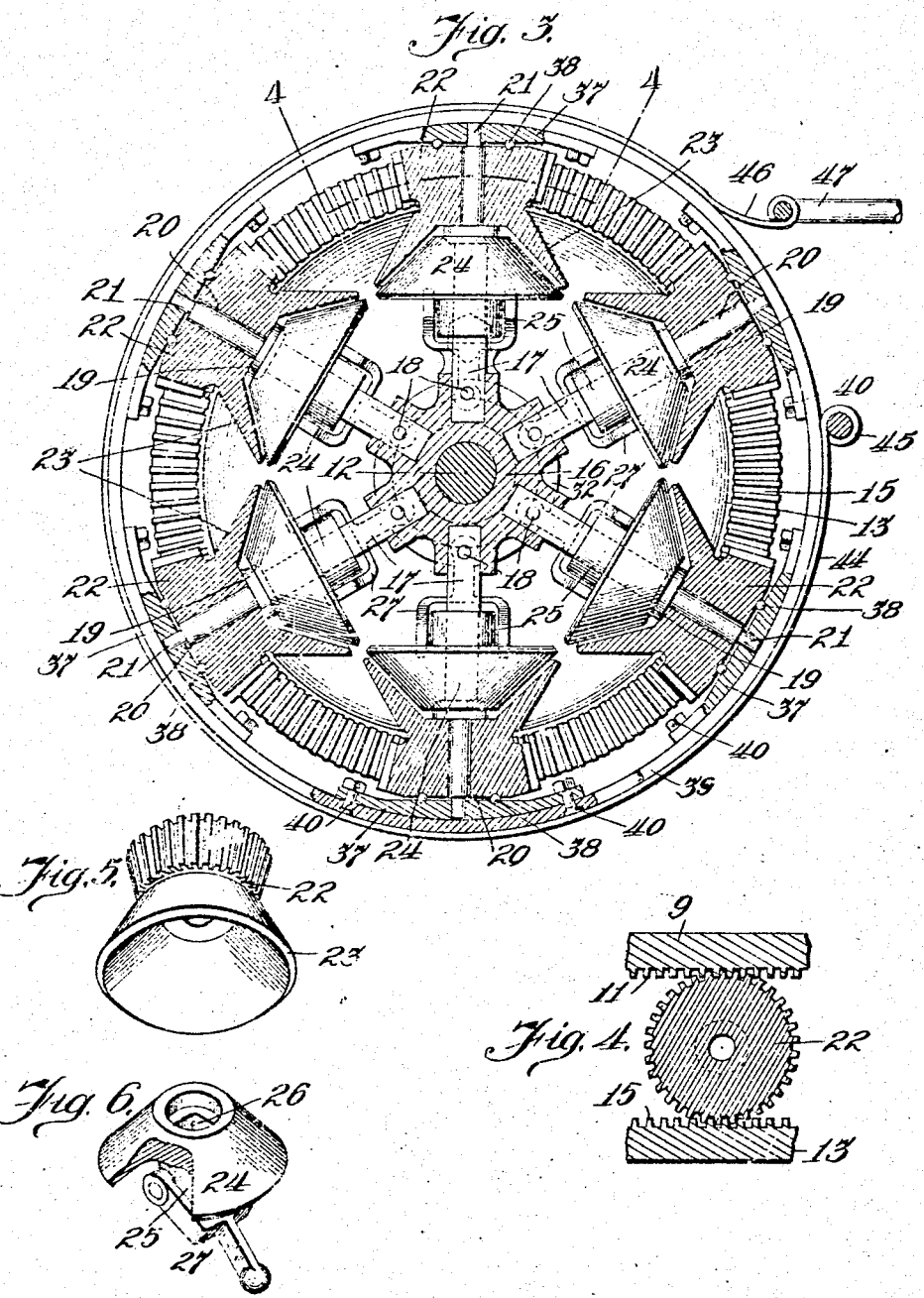

EUGENE C. MARBLE, OF CHICAGO, ILLINOIS.

VARIABLE-SPEED APPARATUS.

938,679.  Specification of Letters Patent.  Patented Nov. 2, 1909.

Application filed December 12, 1908. Serial No. 467,276.

*To all whom it may concern:*

Be it known that I, EUGENE C. MARBLE, a citizen of the United States, residing at Chicago, in the county of Cook and State of Illinois, have invented certain new and useful Improvements in a Variable-Speed Apparatus, of which the following is a specification.

My invention relates to new and useful improvements in variable speed apparatus, and the apparatus is of a type in which the means provided to transmit motion to the driven shaft is rotatable about a plurality of axes.

An important feature of my improvement consists in friction means to retard or prevent rotation of the means to transmit motion to the driven shaft on the primary axis of such means.

A further object of my invention is to provide a variable speed structure in which friction may be employed to reverse the direction of motion.

With these and other objects in view, my invention consists in the novel features and in the novel arrangement and combination of parts hereinafter more specifically described, illustrated in the accompanying drawings, and particularly pointed out in the claims hereunto appended.

In describing the invention in detail, reference is had to the accompanying drawings forming a part of this specification, wherein like reference characters indicate corresponding parts throughout the several views, in which—

Figure 1 is a longitudinal central section of the assembled parts of the variable speed apparatus. Fig. 2 is a perspective view of the same. Fig. 3 is a cross section on line 3—3 of Fig. 1. Fig. 4 is a section on line 4—4 of Fig. 3. Fig. 5 is a perspective view of a bevel pinion and friction surface. Fig. 6 is a perspective view of a companion friction surface, partly broken away to disclose the link attachment.

One embodiment of my invention is described as follows:

Referring to the drawings by reference numerals, 8 designates the drive shaft, 9 its bevel gear wheel keyed at 10, and 11 denotes the teeth of the gear wheel 9. The driven shaft, 12, carries bevel gear wheel 13, keyed at 14. The gear wheel teeth 15 are adapted to mesh with intermediate motion transmitting means which will be further described.

For the purpose of rotation about what is termed a secondary axis there is provided a hub, 16, having spokes 17, preferably rectangular for the major portion of the length, and secured to the hub by means of bolt or screw, 18.

The numeral 19 indicates a collar on the spoke between the rectangular portion and the rounded portion, 20, which forms what is termed the primary axis of the bevel gear pinion, 22. The reduced end portion, 21, of the spoke is disposed in bearing plate, 37, hereinafter mentioned. The friction member, 23, of pinion 22, is termed a skirt, and its companion friction member, 24, is termed a plug. The two parts, the skirt and the plug, preferably are in the general form of a frustum of a cone. The position of the parts may be changed if desired, and the plug may be integral with or attached to the gear pinion and the skirt may be slidably mounted on the spoke. An important function of these friction members is to retard and when desired prevent the rotation of the bevel pinion on its primary axis. The part, 24, has a sleeve portion 25 with rectangular opening therethrough, and the bifurcated link fastening, 27. The ball end, 28, of the link, is seated in a socket in collar, 29, and band, 30, secured by means of screw, 31. The collar, 29, is slidable longitudinally on the hub, 16. The strap, 32, is attached to push rod, 33, slidable in boss, 34. The grooved collar, 35, and strap, 36, with an operating lever (not shown) constitute a part of the means for shifting the collar, 35, longitudinally upon the shaft, 12, for the purpose of producing a corresponding movement of the collar, 29, by means of the rod, 33, and strap, 32. The adjacent faces of the bearing plate, 37, and the end of pinion, 22, are parallel, and have balls, 38, therebetween. The rim or tire, 39, is bolted to the plates, 37, at 40.

For the purpose of operating the internal brake in the apparatus, bell crank 41, strap link 42, and rod 43 to operating lever (not shown) are provided.

For the purpose of retarding and at will preventing rotation of what is termed the variable speed wheel on its axis, there is provided an external band brake, 44, having a fixed end, 45, a movable end, 46, attached to rod 47, which is pivotally secured to foot lever, 48.

In operation, normally, when the drive shaft is in motion, gear teeth, 11, and 15, mesh with pinion, 22, and the pinion is free to rotate on its own (primary) axis and about its secondary axis, the axis of the variable speed wheel, which is rotatable, as shown in the drawings, on the driven shaft. When it is desired to give motion to the driven shaft it may be done without a sudden jar by sliding the collar, 29, inwardly and thus forcing the plugs into frictional contact with the skirts of the pinion 22. The degree of pressure of the plugs against the friction member of each pinion will determine the rapidity with which motion will be imparted to the bevel gear wheel 13 and its driven shaft, 12. Rotation of the pinion, 22, upon its primary axis will be prevented by frictional adherence of the parts 23 and 21, and motion in the same direction as the drive shaft will be given to the driven shaft. The time between the beginning of pressure of the plug against the skirt and the highest pressure required to prevent rotation of the pinion on its primary axis is the time necessary to give the driven gear wheel a speed equal to the driving gear wheel, and in the same direction. To change the direction of motion of the driven shaft, the inner brake means is first disengaged and then the external brake band is applied with sufficient force to completely arrest rotation of the gear pinion on its secondary axis, and the result is a motion in the opposite direction.

The intermediate motion transmitting means is provided with a considerable extent of friction surface and is rotatable about a plurality of axes. In some uses more internal brake surface is shown than is required.

For certain kinds of work only one bevel pinion need be employed. The greater number affords a stronger device and much greater brake surface.

Having thus fully described my invention, what I claim as new, and desire to secure by Letters Patent, is:

1. In a variable speed apparatus, an internal brake comprising a pinion having a friction member and rotatable upon its own axis, and a non-rotatable member movable radially into frictional adherence with the pinion to retard and prevent rotation of the pinion on its own axis.

2. In a variable speed apparatus, the combination of a driving shaft, a gear wheel fixed thereto, a driven shaft, a gear wheel fixed thereto, a pinion in mesh with the gear wheels, and a manually operable internal brake to retard and prevent rotation of the pinion.

3. In a variable speed apparatus, the combination of a driving shaft, a gear wheel fixed thereto, a driven shaft, a gear wheel fixed thereto, a rotatable pinion meshing with both of the gear wheels, an internal brake to retard and prevent rotation of the pinion, and means to manually operate the internal brake.

4. In a variable speed apparatus, the combination of a driving shaft, a gear wheel fixed thereto, a driven shaft, a gear wheel fixed thereto, a rotatable pinion meshing with both of the gear wheels, an internal brake to retard and prevent rotation of the pinion, means to manually operate the brake, and an external brake.

5. In a variable speed apparatus, in combination, a driving shaft, a gear wheel fixed thereto, a driven shaft, a gear wheel fixed thereto, a variable speed wheel, an independently rotatable pinion carried thereby in mesh with both of the gear wheels, the pinion having a friction member, a non-rotatable radially-movable friction member, and manually operable means to move the same into frictional engagement with the member carried by the pinion, and an external brake to retard and prevent rotation of the variable speed wheel on its axis.

6. In a variable speed apparatus, in combination, a driving shaft, a gear wheel fixed thereto, a driven shaft, a gear wheel fixed thereto, a variable speed wheel a plurality of rotatable pinions carried thereby each meshing with the gear wheels, a plurality of internal brakes each comprising a skirt rotatable with the pinion and a non rotatable plug movable radially and means to move it into frictional adherence with the skirt to retard and prevent rotation of the pinion on its axis, and an external brake to retard and prevent rotation of the variable speed wheel on its axis, and means to operate the external brake.

In testimony whereof, I affix my signature, in the presence of two witnesses.

EUGENE C. MARBLE.

Witnesses:
S. ELLA KELLOGG,
WALTER WAGNER.